G. W. CHESTER.
POWER TRANSMISSION DEVICE.
APPLICATION FILED OCT. 13, 1914.
1,166,660.
Patented Jan. 4, 1916.
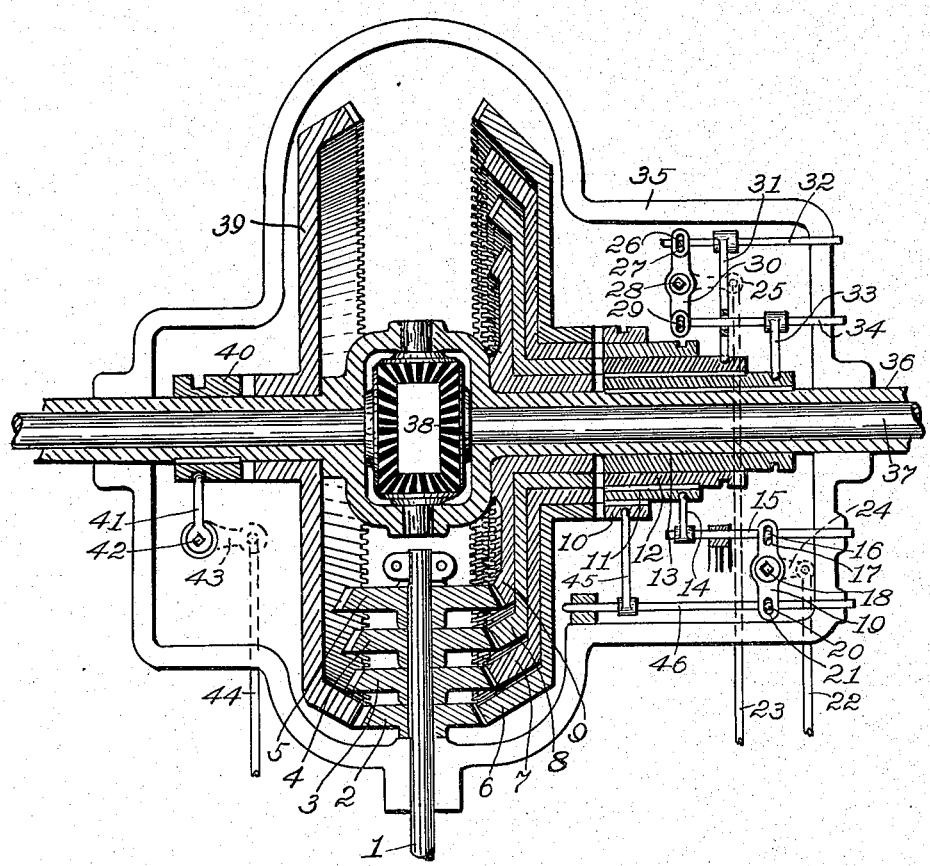
Witnesses:
Inventor,
Gifford W. Chester,
by G. C. Kennedy
ATTORNEY

UNITED STATES PATENT OFFICE.

GIFFORD W. CHESTER, OF WATERLOO, IOWA.

POWER-TRANSMISSION DEVICE.

1,166,660.          Specification of Letters Patent.          Patented Jan. 4, 1916.

Application filed October 13, 1914. Serial No. 866,434.

*To all whom it may concern:*

Be it known that I, GIFFORD W. CHESTER, a citizen of the United States of America, and a resident of Waterloo, Blackhawk county, Iowa, have invented certain new and useful Improvements in Power-Transmission Devices, of which the following is a specification.

My invention relates to improvements in power transmission devices, and particularly for such as are contrived especially for use in motor cars and the like, and the object of my improvement is to provide a transmission device which shall include suitable coacting means for obtaining a desired number of different speeds of rotation for the driven-shaft of the machine, and in which each speed is attained by means of a separate direct drive from the main or driving shaft. This object I have accomplished by the means which are hereinafter described and claimed, and which are illustrated in the accompanying drawings, in which the figure is a horizontal axial section through the moving parts of my said power transmission device, with parts broken away.

The numeral 35 denotes a casing which has bearing seats for the driving-shaft 1 and the driven-shaft parts 37. The two parts of said driven shaft are incased in a boxing 36 which also contains a differential gear 38 connecting said parts. The driving-shaft 1 is located opposite said differential gear, and at a right angle to the driven-shaft 37. Upon the end of said driving-shaft are keyed four pinions 2, 3, 4 and 5, respectively, of progressively increasing diameters. Upon the right-hand part of the boxing 36 the hub of a gear-wheel 9 is rotatably non-slidably mounted, while the hubs of the gear-wheels 8, 7 and 6 are respectively mounted upon each other's hubs in that succession coaxially, rotatably and non-slidably, said wheels being bevel-gears, of increasing diameters respectively, and meshed with the bevel-pinions 5, 4, 3 and 2 respectively. It will be seen, that when the driving-shaft 1 is in rotation, the said pinions will rotate said gear-wheels idly, normally. To cause either of said gear-wheels to rotate said driven-shaft, I have provided a like plurality of clutch-sleeves 10, 11, 12 and 13 which are mounted slidably non-rotatably upon the boxing 36 and upon each other and being in alinement with the hubs of said wheels 6, 7, 8 and 9, respectively. Said sleeves have clutch-faces on their ends which abut upon the adjacent ends of the hubs of said gear-wheels, and the said hubs have on their said adjacent ends mating clutch faces adapted to be engaged by the clutch faces on said sleeves. Each of said sleeves has on its opposite end an annular groove. Said grooves are adapted to receive movably the fingers 45, 14, 31 and 33 mounted upon the slide-rods 46, 15, 32 and 34.

The numerals 19 and 30 denote rock-bodies pivoted respectively at 18 and 28, and having the medial projecting cranks 24 and 25, respectively, to which the ends of connecting rods 22 and 23 are pivoted. These rods are adapted to be moved by levers, not shown. The rock-body 19 has the short longitudinal slots 21 in its opposite ends adapted to slidably receive the studs 20 and 16 projected thereinto from the slide-rods 46 and 15. In like manner, the rock-body 30 has like slots 27 adapted to slidably receive the studs 26 and 29 projected thereinto from the slide-rods 32 and 34 respectively. The bodies 19 and 30 may be rocked oppositely to shift said sleeves 10 to 13, inclusive, into or out of clutch with the alined wheel hubs 6 to 9 inclusive. It will be seen, that when the body 19 is rocked oppositely in one direction it shifts one or the other of the sleeves 10 and 11 into and out of gear with the wheels 6 and 7 respectively. The same is true of the rocking of the body 30 which thus puts one of the sleeves 12 and 13 into or out of clutch with the wheels 8 and 9. By said means, the shaft 37 may be directly driven at either of four speeds ahead. The numeral 39 denotes a bevel gear wheel which is rotatably mounted on the left hand part of the boxing 36 and has a clutch face on the end of its hub, which is directed oppositely or to the left thereof. The numeral 40 denotes a clutch-sleeve slidably and non-rotatably mounted on said boxing, and has a clutch face adapted to mate with the clutch face on said wheel 39 when moved into engagement therewith. Said sleeve has an annular groove to movably receive the finger 41 mounted together with a crank 43 pivoted at 42, said crank having a pivotal connection with the connecting-rod 44, the latter moved to and fro by means of a lever not shown. When the first-mentioned gear wheels are rotating idly upon said boxing, the sleeve 40 may be thrown into clutch with the wheel 39 to reverse the direction of rotation of the shaft 37.

My invention comprises a simple, inexpensive and effective direct transmission at varying speeds, and the principles involved therein will cover variations in the details of construction thereof.

Having described my invention, what I claim as new, and desire to secure by Letters Patent, is:

In combination, a driving-shaft, a driven shaft, a plurality of sleeves mounted non-slidably and rotatably upon each other and with the innermost sleeve non-slidably and rotatably mounted upon said driven-shaft, said sleeves having on their adjacent ends clutch-faces, another plurality of sleeves mounted slidably and non-rotatably upon each other and with the innermost sleeve slidably and non-rotatably mounted on said driven-shaft and having clutch-faces on adjacent ends adapted to be detachably engaged respectively with the clutch-faces on said first-mentioned sleeves which are alined therewith, said first-mentioned sleeves having fixed thereon gear-wheels differing in their diameters, a like number of pinions of differing diameters fixed on said driving-shaft and being in mesh with said gear-wheels to effect different speeds of rotation of said driven-shaft, means for shifting either of said second-mentioned sleeves into or out of mesh with said first-mentioned sleeves, a gear-wheel rotatably non-slidably mounted upon said driven-shaft and having a clutch face on its reverse face, a sleeve slidably non-rotatably mounted on the driven-shaft and having a clutch-face adapted to be engaged detachably with said last-mentioned gear-wheel clutch-face, said gear-wheel being in mesh with one of the gear-wheels on said driving-shaft, and independent means for shifting said last mentioned clutch-sleeve into or out of mesh with the clutch-face on said last-mentioned gear-wheel.

Signed at Waterloo, Iowa, this 26th day of Sept., 1914.

GIFFORD W. CHESTER.

Witnesses:
 GEO. C. KENNEDY,
 PEARL STANTON.

Copies of this patent may be obtained for five cents each, by addressing the "Commissioner of Patents, Washington, D. C."